United States Patent
Yan et al.

(10) Patent No.: US 7,415,710 B1
(45) Date of Patent: Aug. 19, 2008

(54) METHOD AND SYSTEM FOR MAINTAINING A MODULE TYPE DEFINITION TABLE

(75) Inventors: Lin Yan, Bridgewater, NJ (US); Roselle Fernandez, Ft. Collins, CO (US); Robert Andrew Phillips, Somerville, NJ (US); Alberto Bellotti, Hawthorne, NJ (US); Janet Gryck, Belle Mead, NJ (US); Ingrid M. Holzer, Woodbridge, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 860 days.

(21) Appl. No.: 10/614,396

(22) Filed: Jul. 7, 2003

(51) Int. Cl.
*G06F 3/00* (2006.01)
(52) U.S. Cl. ...................... 718/105; 717/168
(58) Field of Classification Search .............. 718/102, 718/105; 717/168
See application file for complete search history.

(56) References Cited

U.S. PATENT DOCUMENTS

| | | | |
|---|---|---|---|
| 6,181,832 B1 * | 1/2001 | Maas, III | 382/294 |
| 6,449,660 B1 * | 9/2002 | Berg et al. | 710/1 |
| 6,629,315 B1 * | 9/2003 | Naylor | 717/168 |
| 2002/0013761 A1 * | 1/2002 | Bundy et al. | 705/37 |
| 2004/0122787 A1 * | 6/2004 | Avinash et al. | 706/50 |

OTHER PUBLICATIONS

Managing and Developing Dynamically Loadable Kernel Modules; p. 489-524 (chapter 12) Jun. 7, 2001 Hewlett-Packard Company.*
The Windows NT Device Driver Book; A Guid for Programmers; p. 414 Art Baker 1997 by Prentice Hall PTR.*

* cited by examiner

*Primary Examiner*—Meng-Ai An
*Assistant Examiner*—Mengyao Zhe

(57) ABSTRACT

The invention provides a method and system for maintaining a module type definition table in a computer processing environment. The method includes dynamically creating a module type definition. The method further includes updating a module type definition table to include the module type definition at the direction of the static operating system kernel. A system and article of manufacture for maintaining a module type definition table are also described.

33 Claims, 5 Drawing Sheets

METHOD AND SYSTEM FOR MAINTAINING A MODULE TYPE DEFINITION TABLE

FIELD OF THE INVENTION

The invention relates to the computer processing arts. It finds particular application to a method and system for maintaining a module type definition table. It will be appreciated that the present invention will find application in any computer processing environment.

BACKGROUND OF THE INVENTION

Certain computer operating systems and applications are designed to load modules that are internally requested by the operating system, internally requested by an application, or externally requested by a supported process. Such modules may include, for example, a procedure, a function, a script, a plug-in module, a driver, or a portion of an executable application.

In some computer operating systems and/or applications, modules that can be loaded are classified according to a module type. For example, in an operating system, the module type may be used to determine how to properly support the module. In some cases, a sub-system of the operating system, such as a dynamically loadable kernel module ("DLKM") sub-system, for example, may be used to support modules of different types.

FIG. 1 illustrates a prior operating system configuration 100 for handling dynamically loadable modules. A table 110 of defined module types and associated type-specific support module identifiers are included in a statically configured operating system kernel 105. Support module identifiers may refer to support modules, such as support module 120, that contain, for example, pre-loading logic, post-loading logic, pre-registration logic, post-registration logic and registration logic.

When the operating system 105 receives a request to load a module 115, the operating system uses the module type definition table 110 to determine whether the module type is supported. Upon locating the correct module type entry in the table, the operating system utilizes the support modules (e.g., support module 120) identified in the table 110 to properly support the requested module 115.

The operating system 105 may provide module type-specific support for only the module types defined by the table within the statically configured kernel. This type of operating system configuration is unable to dynamically load modules of types that have not been previously defined in the statically configured portion of the operating system kernel.

Accordingly, whenever a new module type is to be defined, the statically configured kernel must be reconfigured to include a definition of the new module type. The statically configured kernel must be reloaded to accommodate the newly added module type definition. The reconfiguration of the statically configured kernel results in an increased kernel size and a reloading or rebooting of the operating system.

SUMMARY OF THE INVENTION

Methods and systems for maintaining module type definition tables are provided. According to one embodiment, a method for maintaining a module type definition table by a static operating system kernel is disclosed which includes dynamically creating a module type definition. The method also includes updating a module type definition table to include the module type definition at the direction of the static operating system kernel.

According to another embodiment, a system for maintaining a module type definition table is disclosed. The system includes module type detection logic that detects whether a module is of an undefined module type. The system also includes module type identification logic for assigning a module type associated with the undefined module type. The system further includes support module identification logic for identifying at least one support module associated with the module. The system still further includes support module loading logic for loading the at least one identified support module, and module type definition logic for externally storing data defining the module type.

Articles of manufacture are also disclosed which include processing instructions for maintaining a module type definition table.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example various embodiments of this method and system.

DETAILED DESCRIPTION OF ILLUSTRATED EMBODIMENT

The following includes definitions of exemplary terms used throughout the disclosure. Both singular and plural forms of all terms fall within each meaning:

"Logic", as used herein, includes but is not limited to hardware, firmware, software and/or combinations of each to perform a function(s) or an action(s), and/or to cause a function or action from another component. For example, based on a desired application or needs, logic may include a software controlled microprocessor, discrete logic such as an application specific integrated circuit (ASIC), or other programmed logic device. Logic may also be fully embodied as software.

"Software", as used herein, includes but is not limited to one or more computer readable and/or executable instructions that cause a computer or other electronic device to perform functions, actions, and/or behave in a desire manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

Referring now to one embodiment of the present invention, there is provided a method for maintaining a table of module type definitions external to the statically configured portion of the operating system kernel. Connected therewith, the size of the static kernel and the software development time for new module types is reduced by enabling the loading and unloading of modules previously undefined without the need to reconfigure the static kernel or reboot the computer. Further, enablement of development and delivery of new module types to end users without requiring a kernel patch and/or a reboot of the end user's computer is also possible.

Figure 1:
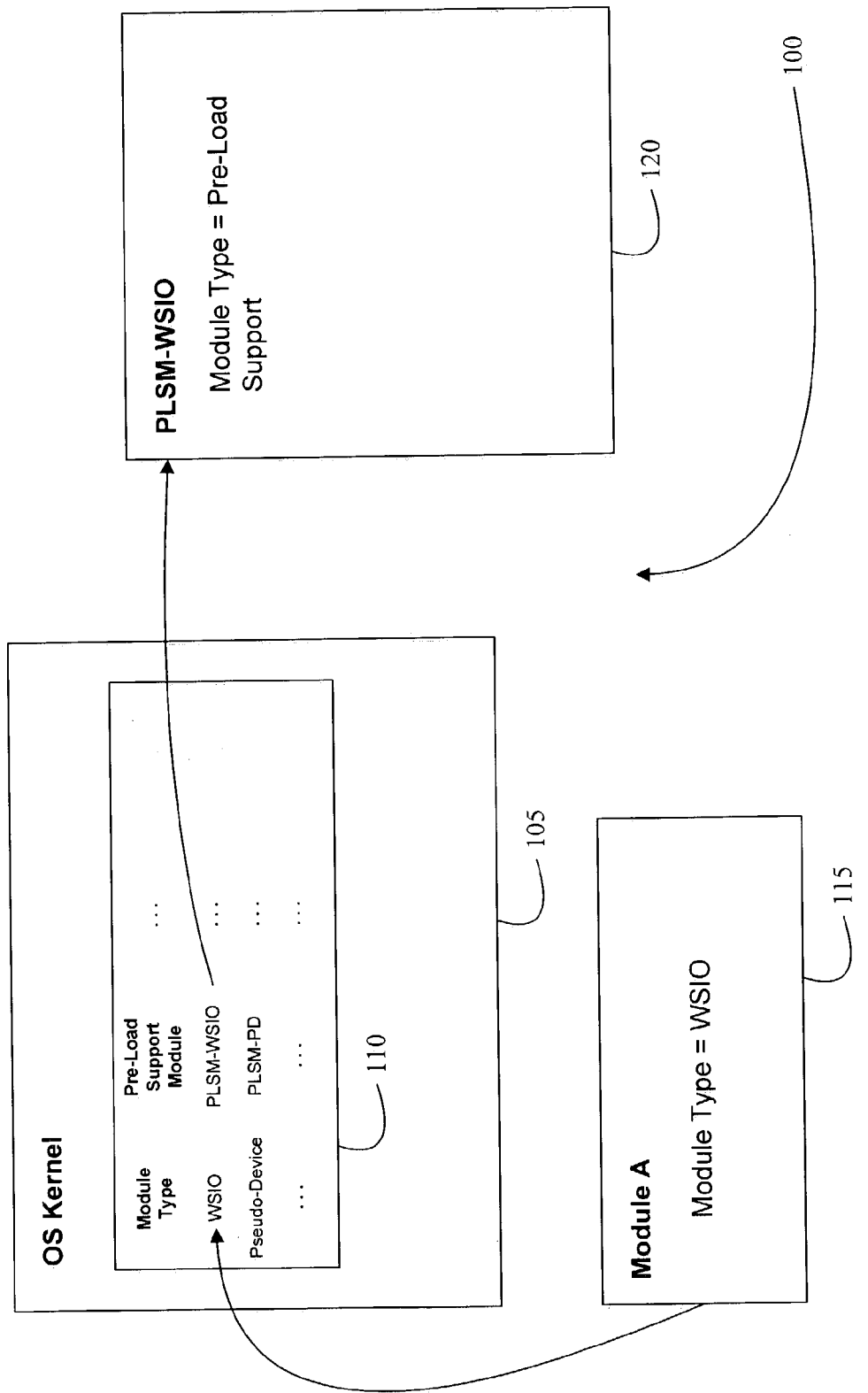
FIG. 1 is a block diagram illustrating an exemplary prior operating system configuration.
Figure 2:
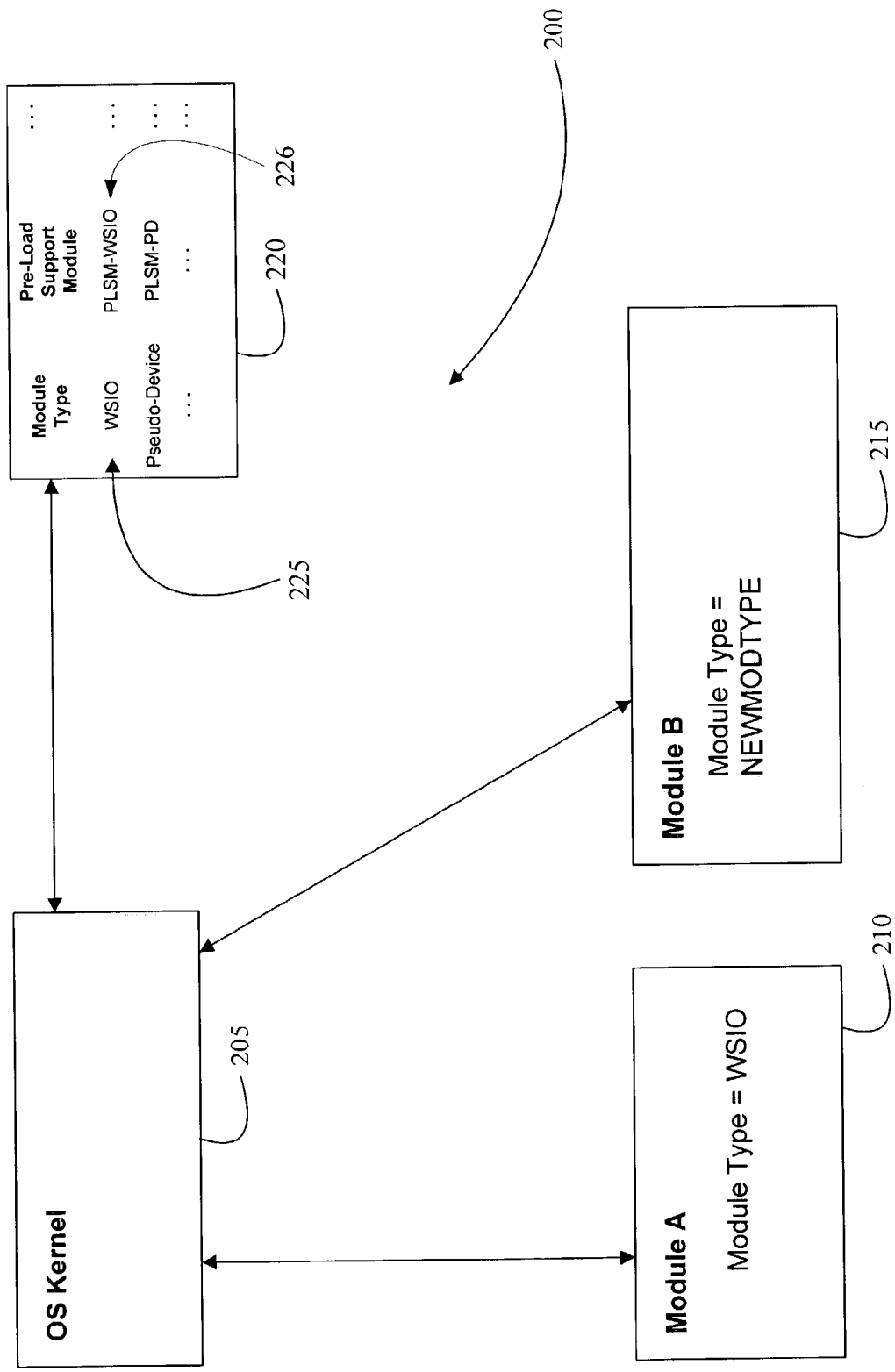
FIG. 2 is a block diagram illustrating an exemplary operating system configuration in accordance with one embodiment of the present invention.

FIG. 2 illustrates an exemplary operating system configuration 200 according to one embodiment of the present invention. In the example depicted in FIG. 2, a statically configured portion of an operating system kernel 205 employs an external module type definition table 220 when servicing a request to load a module, such as modules 210 and/or 215.

As an example of the operation of configuration 200, operating system kernel 205 receives a request to load module A 210. The request may originate from within the operating system or from an application or other process supported by the operating system. Upon receiving the request to load module A 210, operating system kernel 205 identifies the module type of module A to be "WSIO" and uses that information to determine whether the module type has been defined in module type definition table 220. The module type can be identified in any manner, for example, accessing the module and detecting the module identifier, prompting a user to input the identifier, etc. The module type definition table 220 is external to the operating system kernel. The module type associated with the identified module may be used as an index entry into the module type definition table, as is the case in the present example. Upon determining that a module type definition 225 exists for the module type "WSIO", operating system kernel 205 loads and supports module A 210 using the predefined support modules 226 identified in the module type definition 225.

In another example, operating system kernel 205 receives a request to load module B 215. Upon receiving the request to load module B 215, operating system kernel 205 identifies the module type of module B to be "NEWMODTYPE" and uses that information to determine whether "NEWMODTYPE" has been defined in the module type definition table. As noted earlier, the module type can be identified in any manner, for example, accessing the module and detecting the module identifier, prompting a user to input the identifier, etc. In this case, there is no module type definition for the module type "NEWMODTYPE" in module type definition table 220.

Upon determining that the module type definition table 220 does not include a definition for "NEWMODTYPE", operating system 205 executes logic to dynamically add a definition of "NEWMODTYPE" to the module type definition table 220. In one embodiment, the logic for adding the module type definition enables a user to identify the support module(s) responsible for supporting the new module type and stores a definition of the new module type "NEWMODTYPE" in the module type definition table 220. In some cases, a requested module may have a null and/or undefined module type identifier. In such a case, a new module type identifier is preferably automatically generated or provided by an operator or user.

Once the new module type definition is stored in the module type definition table, the operating system 205 preferably uses the newly created module type definition to load the requested module. In addition, the loading of the requested module, module B 215, may include loading one or more support modules identified in the module type definition. Thus, the new module and any required support modules are dynamically identified, defined, and loaded.

It should be appreciated that in addition to merely updating the module type definition table to include a new module type definition, one embodiment extends to updating the module type definition table in accordance with other activities, including for example, removing a module type definition and modifying a module type definition. Further, the described embodiments are not limited to operating with a single external module type definition table. One embodiment includes a first module type definition table within the static kernel and at least a second module type definition table external from the static kernel that may be dynamically maintained.

Figure 3:
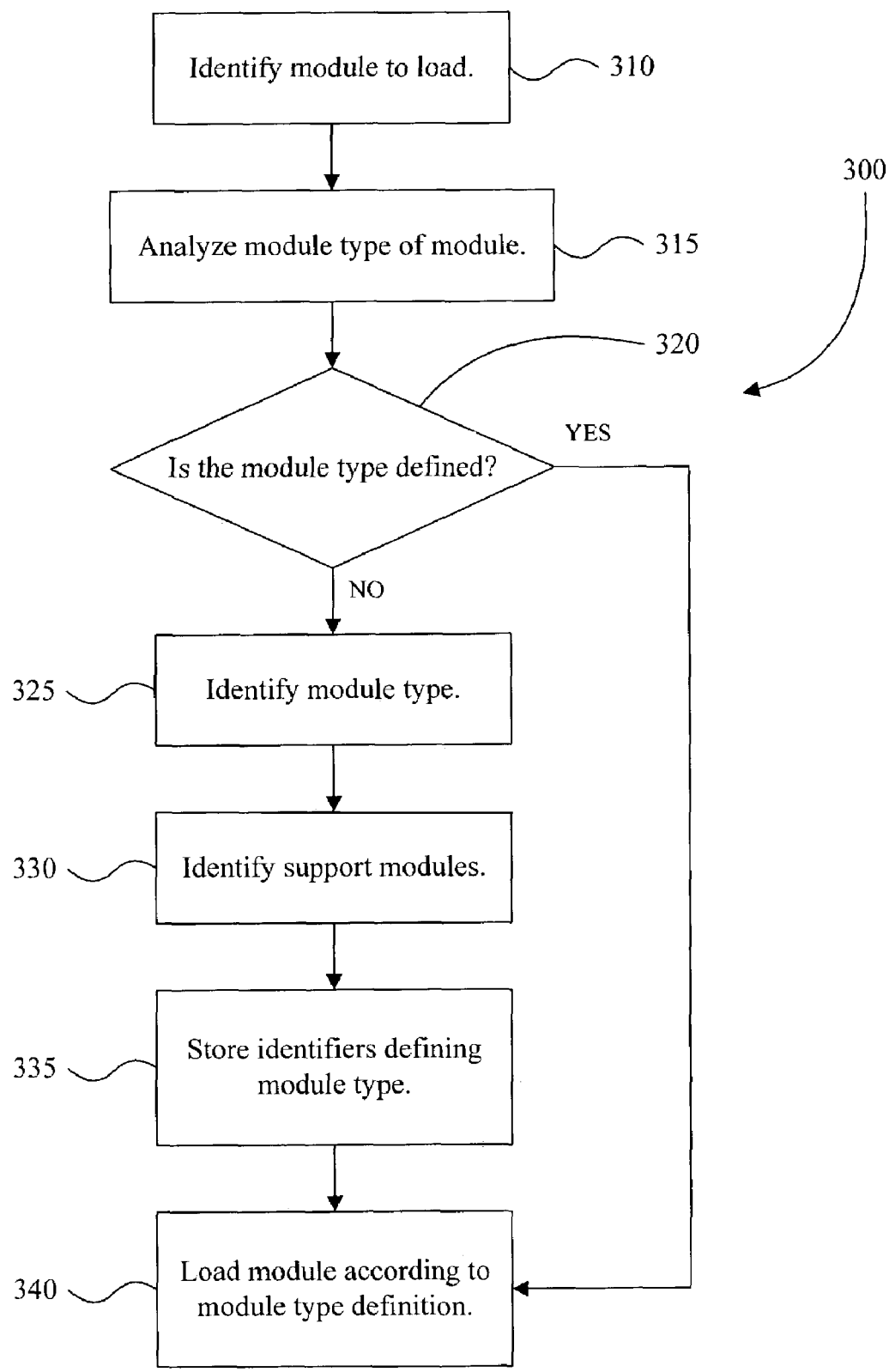
FIG. 3 is an exemplary methodology for maintaining module type definition table in accordance with one embodiment of the present invention.

In FIG. 3 there is exemplary methodology of one embodiment 300 for maintaining a module type definition table. As illustrated, the blocks represent functions, actions and/or events performed therein. It will be appreciated that electronic and software applications involve dynamic and flexible processes such that the illustrated blocks can be performed in other sequences different than the one shown. It will also be appreciated by one of ordinary skill in the art that elements embodied as software may be implemented using various programming approaches such as machine language, procedural, object oriented or artificial intelligence techniques. It will further be appreciated that, if desired and appropriate, some or all of the software can be embodied as part of a device's operating system.

The methodology begins when a module to be loaded is identified at block 310. Before loading the module, a module type associated with the identified module is analyzed at block 315. The module type can be identified in any manner, for example, accessing the module and detecting a module identifier embedded within or associated with the module, prompting a user to input the identifier, etc. At block 320, a determination is made as to whether the module type has been previously defined. The determination is made by referencing the module type definition table that is external to the operating system kernel. If the module type definition table includes an entry for the module type associated with the identified module, then the identified module may be loaded according to the module type definition at block 340.

If the module type associated with the identified module is null and/or if the module type definition table does not include a definition for the module type associated with the identified module, the methodology continues by identifying the module type associated with the identified module at block 325. According to one embodiment, if the module type associated with the identified module is null, a module type identifier can be automatically generated. As another example, if the module type associated with the identified module is null, a module type identifier can be provided by an operator. In yet another example, in the event that the identified module has an associated module type that is not included in the module type definition table, the associated module type identifier may be used as the index entry for a new module type definition. In embodiments where the modules are dynamically loadable kernel modules (DLKM), the module identifiers may be DLKM type identifiers.

In addition to the module type identifier, the operator or user is prompted to provide at least one support module identifier (330). Each support module identifier relates to a support module which may be used to provide module type-specific support for the identified module. Such support modules may include logic for providing, for example, pre-loading support, post-loading support, pre-registration support, post-registration support and/or module registration.

According to one embodiment, each support module identifier may be a pointer or reference to the identified support module. In an alternate embodiment, each support module identifier may be a symbol name associated with the identified support module. Each support module identifier embodied as a symbol name may be resolved dynamically at run time to enable execution of the identified support module.

Upon receiving the new module type identifier and the associated support module identifier(s), the identifiers are stored to the external module type definition table at block 335, thereby providing a module type definition which may be used when loading such a module type in the future. The identified module may then be loaded according to the newly defined module type definition at block 340.

Figure 4:
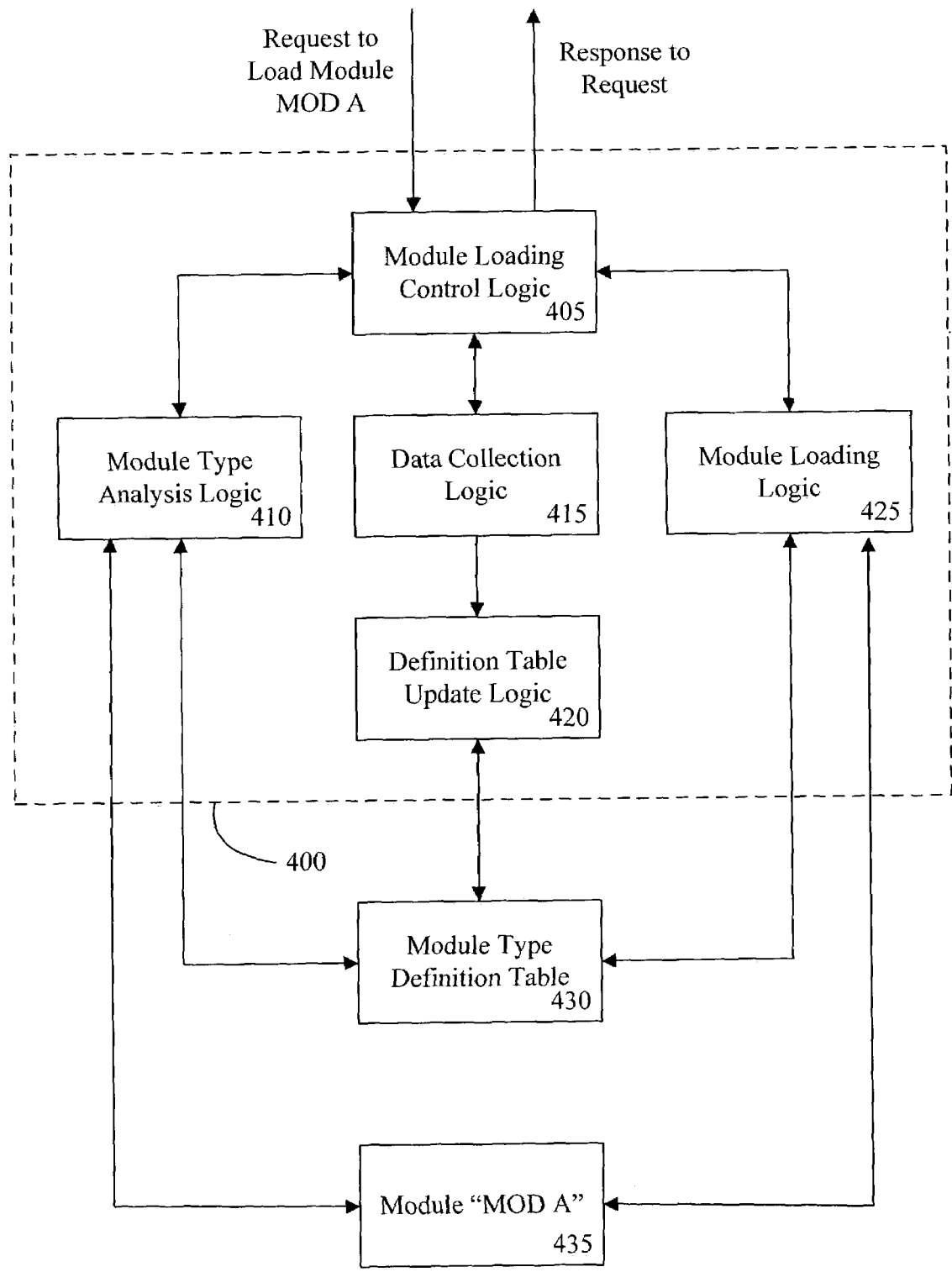
FIG. 4 is a block diagram illustrating an exemplary system for maintaining a module type definition table in accordance with one embodiment of the present invention.

In FIG. 4, there is illustrated an exemplary system 400 for maintaining a module type definition table in accordance with one embodiment of the present invention. The illustrated dynamic module loading system 400 may be a portion of a larger system, such as an operating system or application. The system includes module loading control logic 405 for controlling the operation of the components of the system 400.

The module loading control logic 405 receives a request to load a module 435 and employs module type analysis logic 410 to determine whether the module type associated with module 435 has been previously defined. The module type analysis logic 410 accesses the module 435 to determine its module type, and accesses an external module type definition table 430 to determine whether the module type has been previously defined. The module type definition table is not part of a statically created kernel and may be stored in any conventional persistent storage medium, including for example, a magnetic hard drive, a RAM drive or persistent electronic memory.

If the module type of MOD A 435 has been previously defined, the module loading control logic 405 directs module loading logic 425 to load module 435 in accordance with the associated previously defined module type definition stored in module type definition table 430. If the module type associated with MOD A 435 is null and/or not defined in the module type definition table 430, module loading control logic 405 directs data collection logic 415 to collect the appropriate data to define the module type associated with MOD A 435.

Data collection logic 415 collects data defining the module type of MOD A 435. In one embodiment, data collection logic 415 prompts an operator to provide the module type identifier and any support module identifier(s) which may be associated with the module type. In an alternate embodiment, the module type identifier is retrieved from MOD A 435. In another embodiment, the module type identifier may be automatically generated and assigned to MOD A 435.

The data collection logic 415 provides the module type identifier and support module identifiers(s) to definition table update logic 420. The definition table update logic 420 uses the received identifiers to update module type definition table 430 to include a definition for the module type of MOD A 435, thereby enabling the operating system to load any module having the same module type as MOD A 435 in the future without redefining the module type, without rebooting the computer and without requiring the operating system to be recompiled or patched.

Once a definition for the associated module type has been stored in module type definition table 430, module loading control logic 405 utilizes module loading logic 425 to load MOD A 435. At the conclusion of the process, module loading control logic 405 returns a response to the request to load MOD A 435. The response indicates a completion status of the request.

Figure 5:
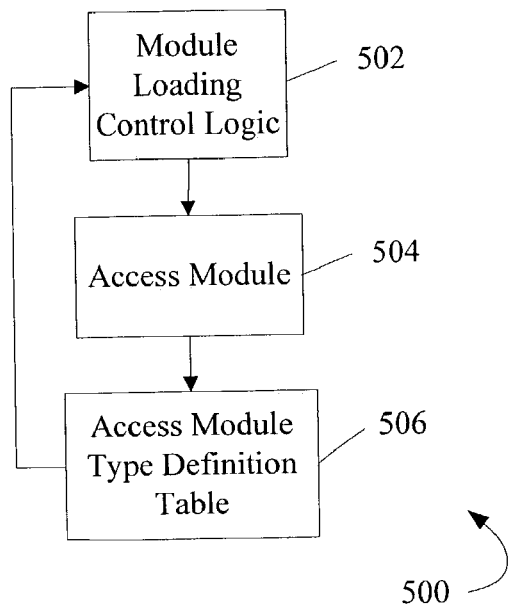
FIG. 5 is an exemplary methodology for analyzing a module type.

FIG. 5 illustrates module type analysis logic 500 in accordance with one embodiment. As in the previous example, a request to load module MOD, A 435 is received by module loading control logic at block 502. The module loading control logic initiates the identification of the module type of MOD A 435, wherein the module analysis logic accesses the module, MOD A 435, at bock 504 and identifies the module type. The module analysis logic includes a detection means to identify the module type or identify that the module type is undefined. In the event that the module type is undefined, the module analysis logic defines the module type. The module analysis logic may define the module type by, for example, prompting a user to enter a module type for MOD A 435. In an alternative embodiment, the module analysis logic may define the module type by, for example, generating and assigning a module type to MOD A 435. Upon either identifying the module type of MOD A 435, or assigning a module type to MOD A 435, the module analysis logic accesses the module type definition table at block 506. The module type analysis logic uses the module type of MOD A 435 to search the module type definition table for a definition that corresponds to the module type of MOD A 435. If the module type of MOD A 435 is defined, MOD A 435 and its support modules may be loaded and control is passed back to the module control logic to initiate loading a module. Loading a module is described in more detail below in FIG. 7. If the module type of MOD A 435 is not defined in the definition table, control is passed back to the module loading control logic to initiate defining a module type and updating the module type definition table, which is illustrated in FIG. 6.

Figure 6:
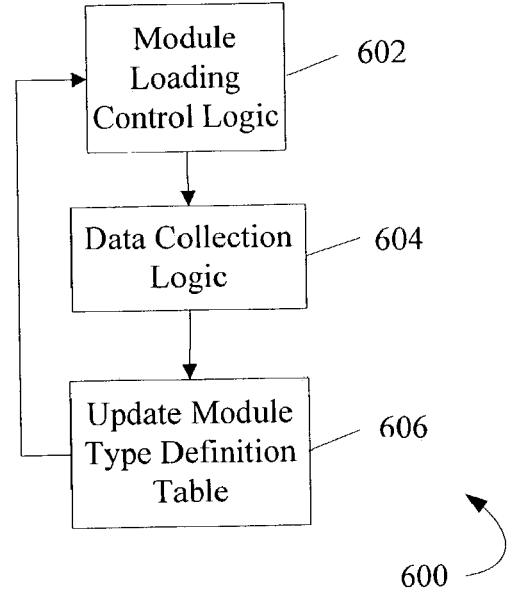
FIG. 6 is a an exemplary methodology for updating a module type definition table.

FIG. 6 illustrates a methodology for updating a module type definition table. Upon determining that a module type is undefined, the module loading control logic initiates definition table update logic 600. Control is passed to the data collection logic at block 604. The data collection logic accesses the module, for example, MOD A 435 and collects data defining the module type of MOD A 435. As described above, for example, the data collection logic can collect data supplied to it by an operator, retrieve data from the module type identifier, etc. Once the data collection logic collects the data, control is passed to block 606 where definition table updated logic updates the external module type definition table. The table is updated, for example, by inputting the module type identifier and the identifiers of any support modules required by the module type identifier. The updated module type definition table enables the operating system to load any module having the same module type as MOD A 435 in the future without updating the module type definition table. Upon updating the module type definition tables, control is passed back to the module loading control logic to initiate loading a module.

Figure 7:
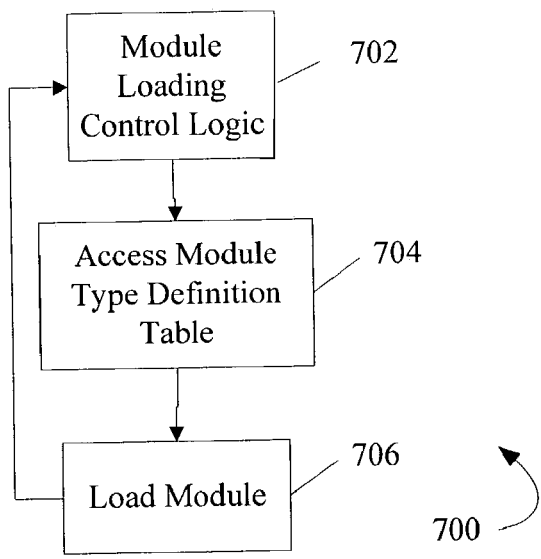
FIG. 7 is a an exemplary methodology for loading a module.

FIG. 7 illustrates module loading logic 700 to load a module that has been defined in the external module type definition table. The module loading control logic initiates a signal to load a module, for example MOD A 435 at block 702. The module loading logic 700 obtains the module type, of for example, MOD A 435 and accesses the module type definition table at block 704. The module loading logic 700 locates the module type of MOD A 435 in the module type definition table and obtains the definition for the module MOD A 435.

The module loading logic utilizes the obtained definition to load MOD A 435 and any support modules that are identified in the module type definition table that are required by MOD A 435. As described above, upon loading the module, MOD A 435, and any supporting modules identified in the module type definition table, control is passed back to the module loading control logic, which preferably initiates a response indicating completion of the request.

In an alternative embodiment, the methodology and/or system is embodied as computer readable code stored on a computer readable medium. The code may include one or more computer/processor executable instructions that cause the computer to act in a selected manner. The computer readable medium may be an optical storage device such as a CD-ROM or DVD-ROM, a magnetic storage device such as a hard disk or floppy disk, an electronic storage device such as a memory card, RAM, ROM, EPROM, EEPROM, or flash memory, or any other storage device capable of storing computer readable processor instructions.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. A method for maintaining an external module type definition table by a statically configured portion of an operating system kernel that is executable by a processor, comprising:
   identifying a module,
   identifying a module type of the module;
   searching an external module type definition table that is external to the statically configured portion of the operating system kernel for the module type;
   determining the module type is not defined in the external module type definition table;
   dynamically creating a module type definition including at least one support module identifier;
   updating the external module type definition table to include the dynamically created module type definition and;
   loading the module based upon the module type and at least one support module identified by the support module identifier without reloading the statically configured portion of the operating kernel.

2. The method of claim 1, wherein dynamically creating a module type definition includes receiving an operator generated dynamically loadable kernel module type identifier.

3. The method of claim 1, wherein dynamically creating a module type definition includes receiving a computer generated dynamically loadable kernel module type identifier.

4. The method of claim 1, wherein creating a module type definition includes receiving at least one support module identifier associated with control logic operative to conduct pre-registration support.

5. The method of claim 1, wherein creating a module type definition includes receiving at least one support module identifier associated with control logic operative to conduct a registration function.

6. The method of claim 1, wherein creating a module type definition includes receiving at least one support module identifier associated with control logic operative to conduct post-registration support.

7. The method of claim 1, wherein creating a module type definition includes receiving at least one support module identifier associated with control logic operative to conduct pre-loading support.

8. The method of claim 1, wherein creating a module type definition includes receiving at least one support module identifier associated with control logic operative to conduct post-loading support.

9. The method of claim 1, wherein creating a module type definition includes receiving at least one of a pointer and a reference, each at least one of a pointer and a reference being respectively associated with a support module.

10. The method of claim 1, wherein creating a module type definition includes receiving at least one symbol name, each symbol name being respectively associated with a support module.

11. A system including a processor for maintaining an external module type definition table that is external to a statically configured portion of an operating system kernel, comprising:
    module type detection logic on a computer readable medium for detecting that a module is of an undefined module type;
    module type identification logic on the computer readable medium for assigning a new module type associated with the module;
    support module identification logic on the computer readable medium for identifying at least one support module used to support the module type;
    support module loading logic on the computer readable medium for loading the at least one identified support module;
    module type definition logic on the computer readable medium for dynamically defining the module type as a function of the module type and for externally storing the module type data, including data identifying at least one support module used to support the module type, thereby updating the external module type definition table; and
    logic for loading the module without reloading the statically configured portion of the operating kernel.

12. The system of claim 11, wherein the module type identification logic includes logic for receiving an operator generated dynamically loadable kernel module type identifier.

13. The system of claim 11, wherein the module type identification logic includes logic for receiving a computer generated dynamically loadable kernel module type identifier.

14. The system of claim 11, wherein the support module identification logic includes logic for identifying a support module operative to conduct pre-registration support.

15. The system of claim 11, wherein the support module identification logic includes logic for identifying a support module operative to conduct a registration function.

16. The system of claim 11, wherein the support module identification logic includes logic for identifying a support module operative to conduct post-registration support.

17. The system of claim 11, wherein the support module identification logic includes logic for identifying a support module operative to conduct pre-loading support.

18. The system of claim 11, wherein the support module identification logic includes logic for identifying a support module operative to conduct post-loading support.

19. The system of claim 11, wherein the support module identification logic is operative to receive at least one of a pointer and a reference, each at least one of a pointer and a reference being respectively associated with each of the at least one support module.

20. The system of claim 11, wherein the support module identification logic is operative to receive at least one symbol name, each symbol name being respectively associated with each of the at least one support module.

21. A computer-readable storage medium encoded with processing instructions executable by a processor for maintaining an external module type definition table for use by a statically configured portion of an operating system kernel, comprising:
   instructions to identify a module type of a first module;
   instructions to determine that the module type of the first module is undefined;
   instructions to identify data defining the module type of the first module; and
   instructions to identify a support module used to support the first module type;
   instructions to store the data defining the module type, including the support module that is used to support the module type, in the external module type definition table that is external to the statically configured portion of the operating system kernel; and
   instructions to load the first module based upon the module type without reloading the statically configured portion of the operating kernel.

22. The computer-readable storage medium of claim 21 wherein the data defining the module type comprises a pre-loading support module.

23. The computer-readable storage medium of claim 21 wherein the data defining the module type comprises a post-loading support module.

24. The computer-readable storage medium of claim 21 wherein the data defining the module type comprises a pre-registration support module.

25. The computer-readable storage medium of claim 21 wherein the data defining the module type comprises a post-registration support module.

26. An operating kernel on a computer readable medium, the operating kernel being executable by a processor, comprising:
   logic on the computer readable medium to receive a request to load a module,
   logic on the computer readable medium to identify a module type of the module,
   logic on the computer readable medium to reference an external module type definition table that is external to a statically configured portion of the operating system kernel,
   logic on the computer readable medium to identify at least one support module used to support the module type in the external module type definition table,
   logic on the computer readable medium to load the module based upon the module type and the at least one support module associated with the module type without reloading the statically configured portion of the operating kernel,
   logic on a computer readable medium for identifying at least one module type not previously defined in the external module type definition table,
   logic on the computer readable medium to dynamically define the at least one module type, the definition including an identifier for at least on support module,
   logic on the computer readable medium to update the external module type definition table with the dynamically defined at least one module type.

27. The operating kernel of claim 26, where the logic to dynamically define the at least one external module type includes receiving an operator identified module type.

28. The operating kernel of claim 26, where the logic to dynamically define the at least one external module type includes receiving at least one identified support modules from an operator.

29. An operating system kernel on a computer readable medium, the operating system kernel being executable by a processor, comprising:
   logic on the computer readable medium to receive a request to load a module,
   logic on the computer readable medium to identify a module type associated with the module,
   logic on the computer readable medium to reference an external module type reference table that is external to the statically configured portion of the operating kernel,
   logic on the computer readable medium to determine the module type is undefined in the external module type reference table,
   means on the computer readable medium to identify at least one support module used to support the module type and associate that support module with a definition of the module type in the external module type reference table, and
   means on the computer readable medium to dynamically load the module without reloading the statically configured portion of the operating system kernel.

30. The operating system kernel of claim 29, wherein the means to dynamically load the module comprises:
   means to dynamically define the module type that is undefined in the module type reference table,
   means to dynamically update the external module type definition table to include the defined module type,
   logic to load the module based upon the updated external module type definition table.

31. The operating system kernel of claim 30, wherein the means to dynamically define the module type that is undefined in the module type reference table comprises logic on the computer readable medium to receive at least one operator generated module type.

32. The operating system kernel of claim 30, wherein the means to dynamically define the module type that is undefined in the module type reference table comprises logic on the computer readable medium to receive at least one software generated module type.

33. The operating system kernel of claim 30, wherein the means to dynamically define the module type that is undefined in the module type reference table comprises logic on the computer readable medium to identify at least one support module associated with the module type.

* * * * *

UNITED STATES PATENT AND TRADEMARK OFFICE
CERTIFICATE OF CORRECTION

PATENT NO. : 7,415,710 B1
APPLICATION NO. : 10/614396
DATED : August 19, 2008
INVENTOR(S) : Lin Yan et al.

Page 1 of 1

It is certified that error appears in the above-identified patent and that said Letters Patent is hereby corrected as shown below:

In column 7, line 48, in Claim 1, delete "and;" and insert -- ; and --, therefor.

In column 10, line 6, in Claim 26, after "at least" delete "on" and insert -- one --, therefor.

Signed and Sealed this

Fourth Day of August, 2009

JOHN DOLL
*Acting Director of the United States Patent and Trademark Office*